United States Patent
Osterhart et al.

(10) Patent No.: US 6,593,027 B1
(45) Date of Patent: Jul. 15, 2003

(54) COMBINATION BATTERY COVER, HEAT SHIELD AND HOLD DOWN

(75) Inventors: Daniel J. Osterhart, Auburn Hills, MI (US); Robert D. Keller, Davisburg, MI (US)

(73) Assignee: Eaton Corporation, Cleveland, OH (US)

( * ) Notice: Subject to any disclaimer, the term of this patent is extended or adjusted under 35 U.S.C. 154(b) by 207 days.

(21) Appl. No.: 09/626,675

(22) Filed: Jul. 27, 2000

(51) Int. Cl.⁷ .................................. H01M 2/02
(52) U.S. Cl. .................. 429/96; 429/100; 429/163
(58) Field of Search ........................ 429/148, 149, 429/152, 153, 163, 164, 167, 171, 176, 175, 177, 178, 100, 96, 120

(56) References Cited

U.S. PATENT DOCUMENTS 5,681,668 A * 10/1997 Reed et al. ............... 429/100
6,224,998 B1 * 5/2001 Brouns et al. ............ 429/100

* cited by examiner

Primary Examiner—Randy Gulakowski
Assistant Examiner—Monique Wills
(74) Attorney, Agent, or Firm—Roger A. Johnston

(57) ABSTRACT

A combination battery cover, heat shield, hold down having preferably formed integrally as one piece with flexible living hinges a pair of battery electrode covers. The cover has a cross channel on the undersurface which communicates with riser channels provided between ribs provided in the battery tray side wall. Apertures are formed between the tray sidewall ribs to provide air to the risers. An air deflector extends outwardly from the tray sidewall to direct air flow to the apertures in the tray. In an alternative embodiment, the electrode caps are attached by separately formed living hinges attached to the caps.

14 Claims, 9 Drawing Sheets

COMBINATION BATTERY COVER, HEAT SHIELD AND HOLD DOWN

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to systems for mounting batteries in motor vehicles and particularly battery mounting systems for passenger cars and light trucks wherein the battery is typically mounted in the engine compartment over a wheel fender well and consequently is subject to heat radiation from the engine and under hood ambient conditions. Heretofore, it has been common practice, particularly in passenger cars, to provide a battery tray mounted on the side wall of the engine compartment, often from the fender structure and to provide hold down clamps at the base of the battery which attach to the tray or clamping bars across the top of the battery with bolts extending downwardly to the battery tray for retaining the battery securely in the tray.

However, recent changes in vehicle body designs to increase the aerodynamic efficiency of the vehicle have resulted in lower hood and fender lines with resultant reduction in space in the engine compartment for the engine and accessory components including the battery. This has resulted in the battery being spaced more closely to engine components operating at elevated temperatures and has resulted in prohibitively high temperatures for the battery resulting in hazards of fire where lead-acid type storage batteries are utilized.

Also, in recent designs for automotive battery installation, it has become desirable to provide covers for the battery electrodes or connector terminals in order to prevent inadvertent short circuiting with tools or implements during access to the engine compartment during maintenance and service operations, and to thus prevent hazardous conditions during such operations.

Therefore, it has been desired to provide a way or means of easily covering the battery and providing a heat shield along the side of the battery and to provide for air circulation around the battery to prevent a prohibitive rise in the temperature of the battery during vehicle engine operation. It has further been desired to provide a way or means of providing such cover, heat shield and air circulation in a manner which is not prohibitive in cost for high volume mass production and which is simple and easy to install during vehicle manufacture.

BRIEF SUMMARY OF THE INVENTION

The present invention provides a solution to the problem of covering, heat shielding and securing a motor vehicle battery and provides for air circulation over the battery in a manner which is cost effective and easy to install during manufacture of the motor vehicle.

The present invention provides a battery mounting tray construction which has channels along a side thereof which communicate with air circulation ports through the base of the tray permitting air flow upwardly therealong for communication with an airflow channel in the battery cover to provide circulation over the top of the battery. The battery cover has formed integrally therewith a heat shield which extends downwardly over the side of the battery and has a mounting portion provided at the lower edge thereof which is adapted to be wedged against a groove in the battery when the mounting portion is fastened to the battery tray for securing the battery to the tray. The one-piece battery cover and heat shield has also provided and preferably formed integrally therewith a pair of battery terminal cover pieces which are attached to the battery cover by flexible strips comprising "living" hinges which enable the covers to be positioned over the battery electrodes or terminals after installation of the cover/heat shield, with the living hinges recessed below the top surface of the battery cover.

The present invention thus provides a unique and novel solution to the problem of providing a battery cover, a heat shield as a one piece member which has a mounting portion integral therewith which also serves to wedge the battery into the tray for secure mounting. Battery electrode caps are provided attached by "living" hinges and preferably integrally formed as one piece with the combination cover/heat shield.

DETAILED DESCRIPTION OF THE INVENTION

Referring to FIGS. 1 through 6, the assembly of the present invention is indicated generally at 10 and includes a battery tray indicated generally at 12 and a combined one-piece battery cover, heat shield and battery terminal cover indicated generally at 14 and a mounting clip 16 (see FIG. 9) and a retaining fastener such as bolt 18.

Figure 1:
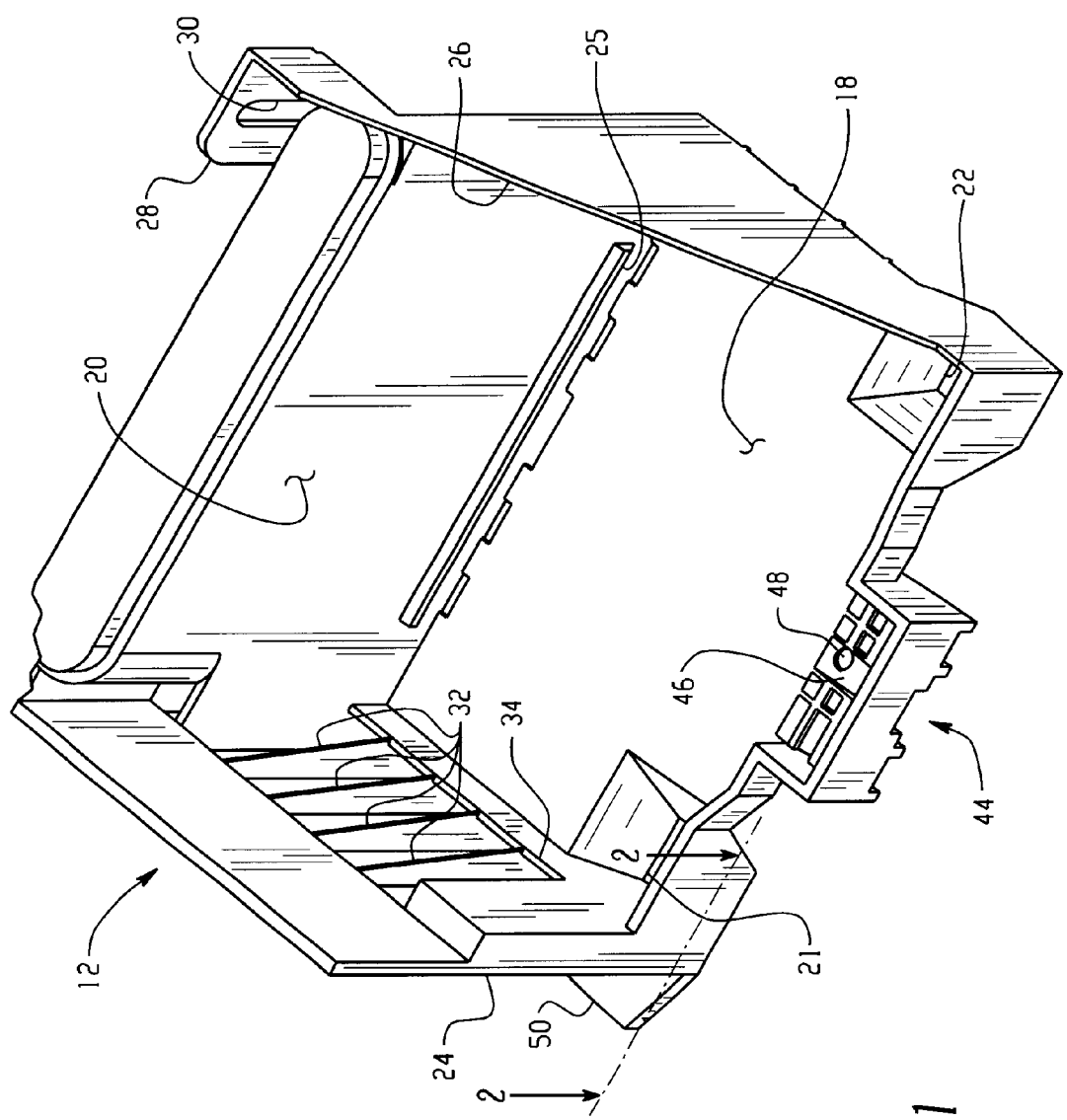
FIG. 1 is an axonometric view of the battery tray for use with the present invention.
Figure 2:
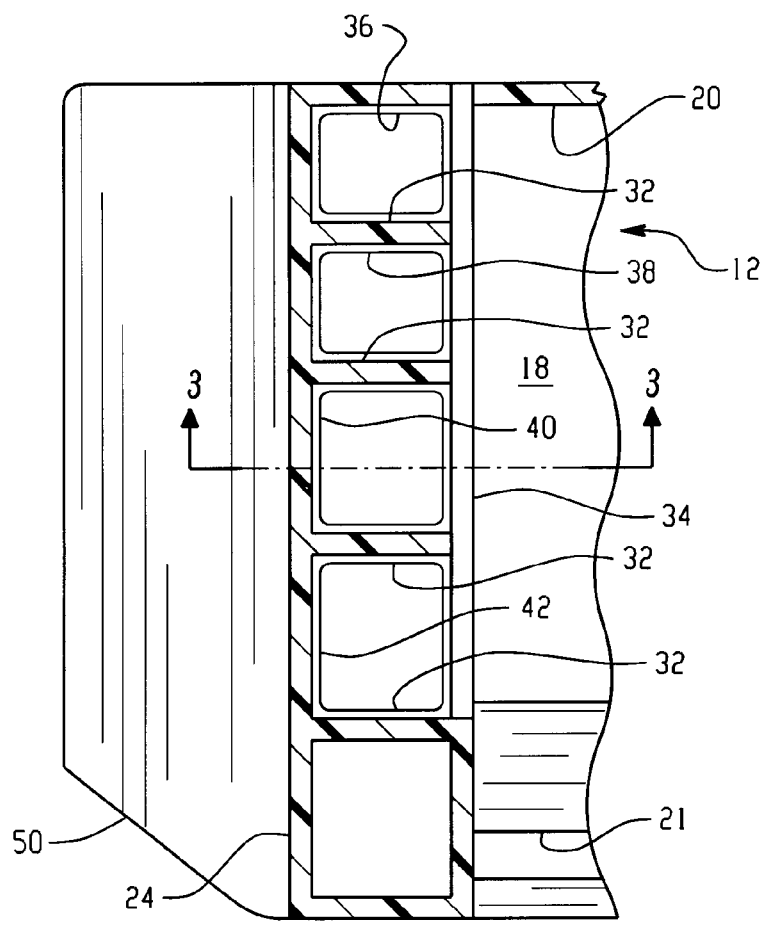
FIG. 2 is a section view taken along section-indicating lines 2—2 of FIG. 1.
Figure 3:
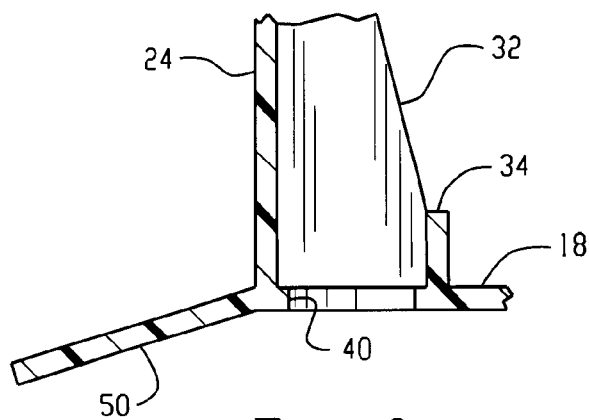
FIG. 3 is a section view taken along section-indicating lines 3—3 of FIG. 2.

Referring to FIGS. 1 through 3, battery tray 12 includes a deck 18 having drain slots 21, 22 formed in the front corners thereof and an integrally fastened upstanding rear wall 20 and a side wall 24 attached to the deck and rear wall on one end of the deck, with a gusset or partial wall 26 interconnecting the opposite end of the deck and the rear wall. The rear wall may include a mounting tab or bracket 28 formed integrally therewith and having an aperture 30 formed therein for receiving a suitable fastener therethrough.

The sidewall 24 has provided on the inner face thereof a plurality of vertically extending horizontally spaced ribs 32 which are braced by a reinforcing partition 34 which extends upwardly from the deck 18; and, ribs 32 extend upwardly to the upper edge of wall 24.

Referring to FIGS. 2 and 3, an aperture 36 is formed through the deck 18 in the space between rear wall 20 and the adjacent one of the ribs 32; and, apertures are also formed through the deck 18 in the space between the remaining ribs 32 as denoted by reference numerals 38, 40 and 42.

Referring to FIG. 1, the battery tray 12 has on the front edge of deck 18 an extension indicated generally at 44 which has a downwardly inclined surface 46 provided thereon and which has an aperture 48 formed therein for receipt of a fastener therethrough.

Battery tray 12 also has extending outwardly from sidewall 24, at the lower edge thereof and inclined slightly downwardly from the level of deck 18, an air deflector 50 for directing flow of air to the apertures 36 through 42 as will hereinafter be described.

Figure 9:
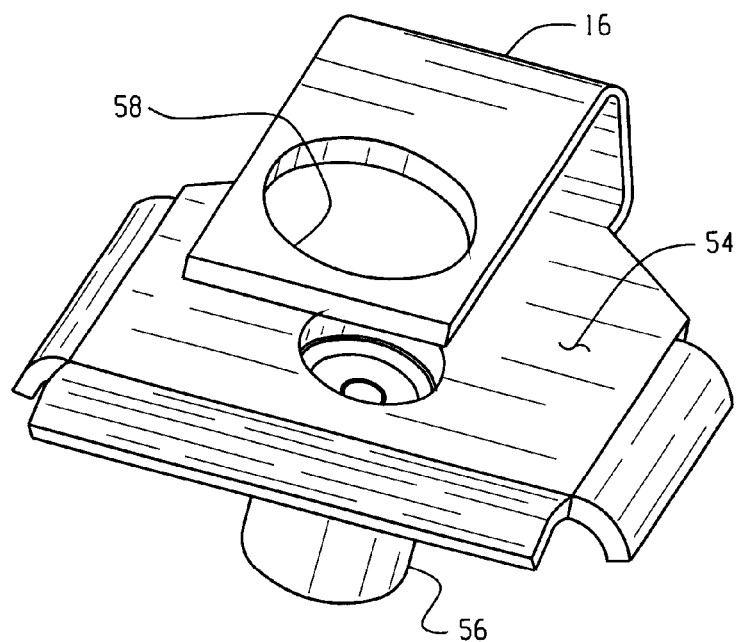
FIG. 9 is an axonometric view of the hold down clip employed in the assembly of FIG. 4; 5
Figure 10:
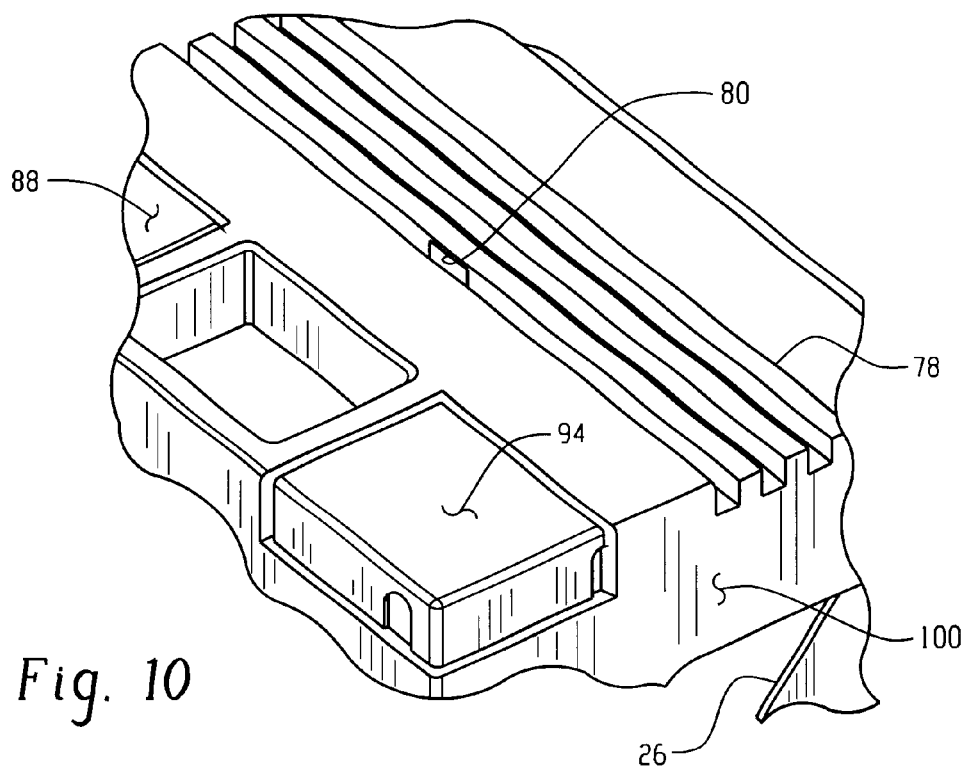
FIG. 10 is an enlarged view of a portion of FIG. 6 showing a vent in the cover.
Figure 11:
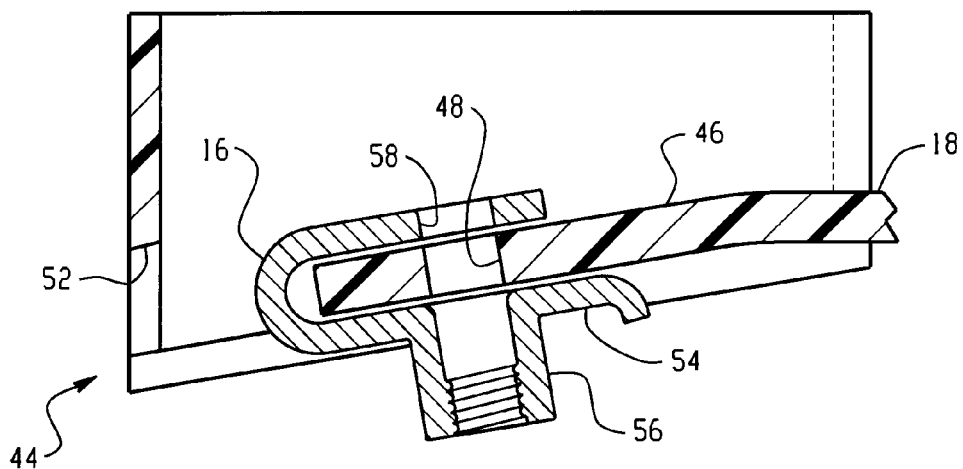
FIG. 11 is an enlarged view of a portion of FIG. 7.

Referring to FIGS. 9 and 11, the battery tray mounting portion 44 is shown in greater detail where the inclined surface 46 is accessible via a slot 52 formed in the outer edge of the mounting portion 44 to permit the U-shaped mounting clip 16 to be slipped thereover so that the internally threaded projection 56 extending from the lower leg 54 of clip 16 is aligned with the aperture 48 in the inclined surface 46; and, an aperture 58 formed in the opposite leg of U-shaped clip 16 from leg 54 is also aligned with the aperture 48.

Figure 4:
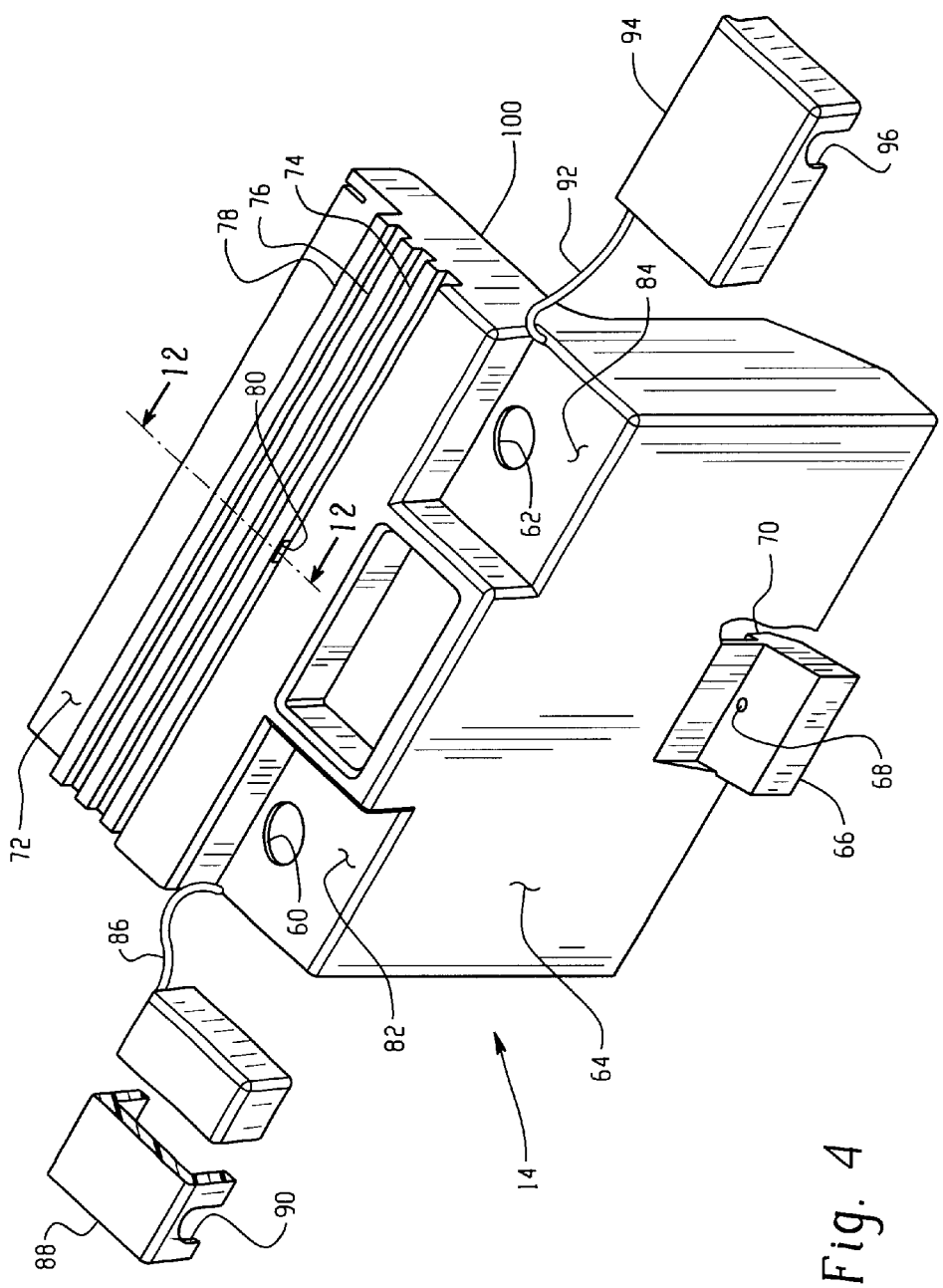
FIG. 4 is an axonometric view of the combined battery cover and heat shield member of the present invention.

Referring to FIG. 4, the combined cover and heat shield has spaced apertures or voids 60, 62 formed in the cover portion thereof which are adapted to be received over battery electrode terminals as will hereinafter be described.

The combined cover/heat shield 14 is formed by molding and has a downwardly extending heat shield portion 64 thereof formed with a mounting block or lug portion 66 exteding therefrom and formed integrally therewith as one piece with a bolt receiving aperture 68 formed therethrough. The mounting portion block has a heel portion 70 extending inwardly of the heat shield 64, which portion is adapted to engage a toe flange provided in the base of the battery as is well known in the art.

Figure 12:
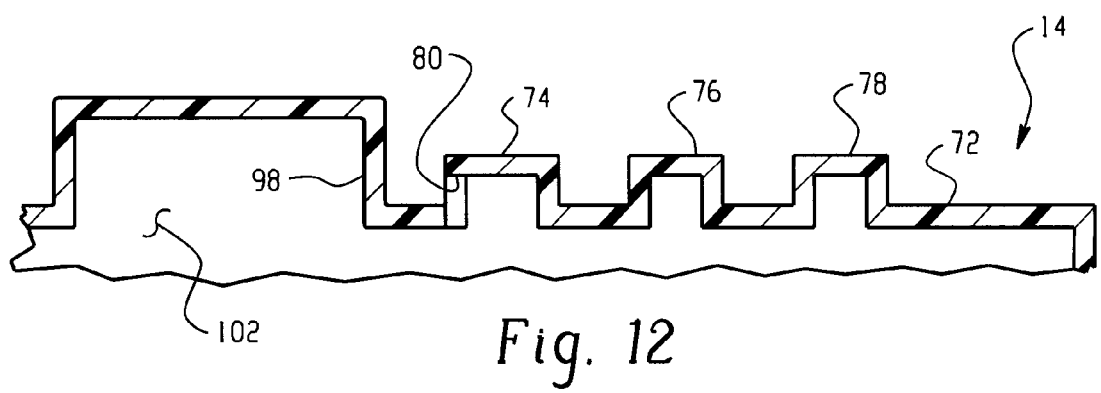
FIG. 12 is a section view taken along section-indicating lines 12—12 of FIG. 4; and, FIG. 13 is a view of an alternate embodiment of the invention.

Referring to FIGS. 4 and 12, the upper surface of the cover portion 72 of the member 14 has a plurality of longitudinally extending transversely spaced stiffening ribs 74, 76, 78 formed integrally therewith; and, one of the ribs has formed in the side thereof a venting passage 80.

Referring to FIG. 4, the member 14 is formed with a recess around each of the battery electrode apertures 62 as denoted by reference numeral 82, 84.

A flexible strip 86 is provided and preferably formed integrally by welding with the edge of recess 82 of member 14 and extends outwardly from the sidewall of the cover 14 and has integrally molded with the opposite end thereof a generally rectangular inverted cup-shaped molded battery terminal or electrode cover member 88 which has a slot 90 formed in the front edge thereof for receiving a battery cable therethrough. The strip 86 thus interconnects member 14 and battery terminal cover 88.

A second flexible strip member 92 extends outwardly from the edge of recess 84 and has preferably integrally formed by molding therewith at the end thereof a second inverted cup-shaped molded battery terminal or electrode cover member 94 having a slot 96 formed in the front edge thereof which is adapted to receive a battery cable as will hereinafter be described. Strip 92 thus interconnects member 14 and battery terminal cover 94.

Figure 5:
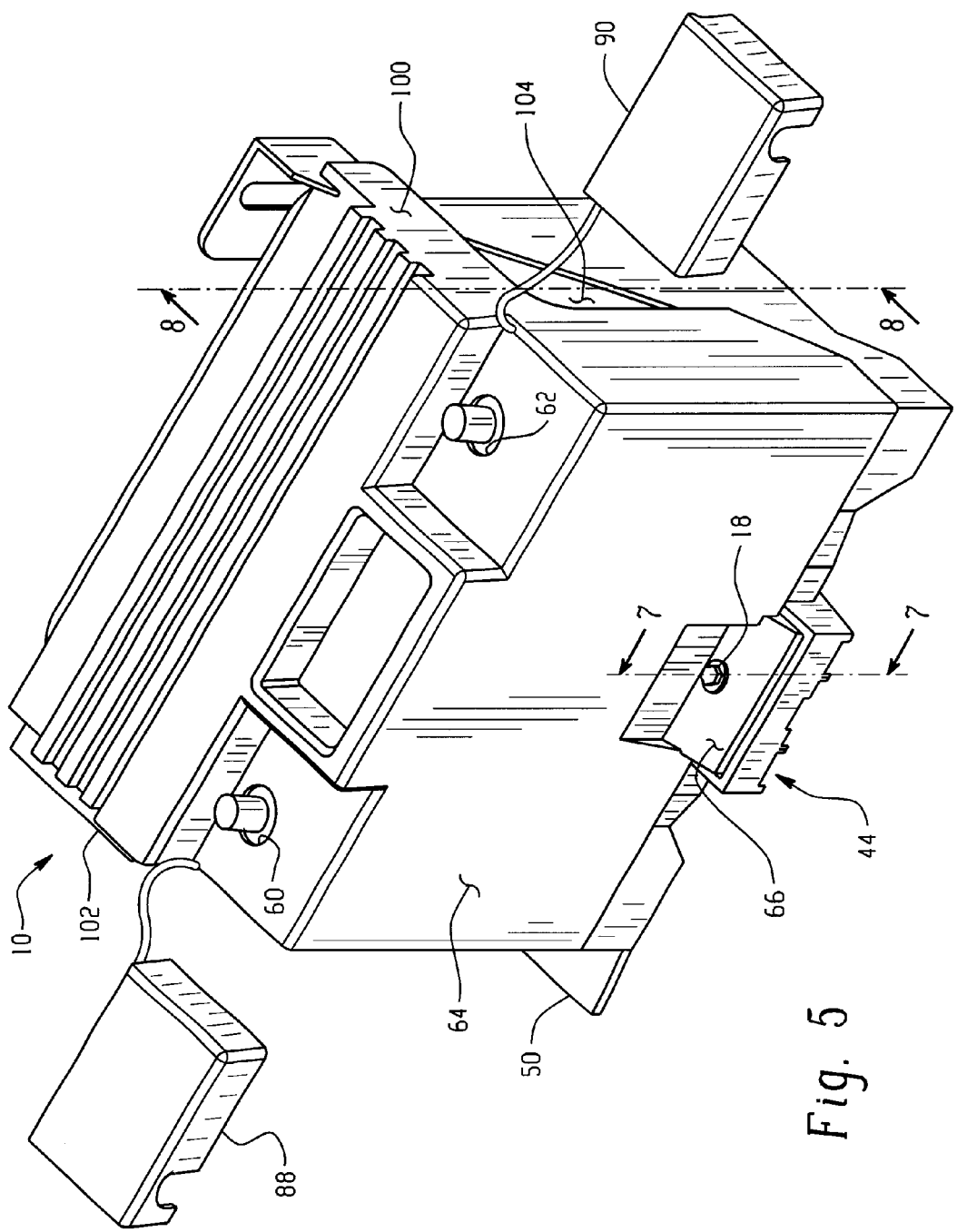
FIG. 5 is an axonometric view of the battery cover installed over a battery on the tray of the present invention.

Referring to FIG. 5, the battery tray is shown with a battery situated thereon with the member 14 installed thereover such that the battery electrodes extend through the apertures 60, 62. The mounting block is disposed over the clip and retaining portion 68 such that the heel 70 has engaged the groove above the toe flange in the battery; and, a suitable fastener such as bolt 18 is received through the aperture 68 in the mounting block and secures the mounting block against the battery thereby wedging the battery against the wall 20 of the battery tray.

Figure 7:
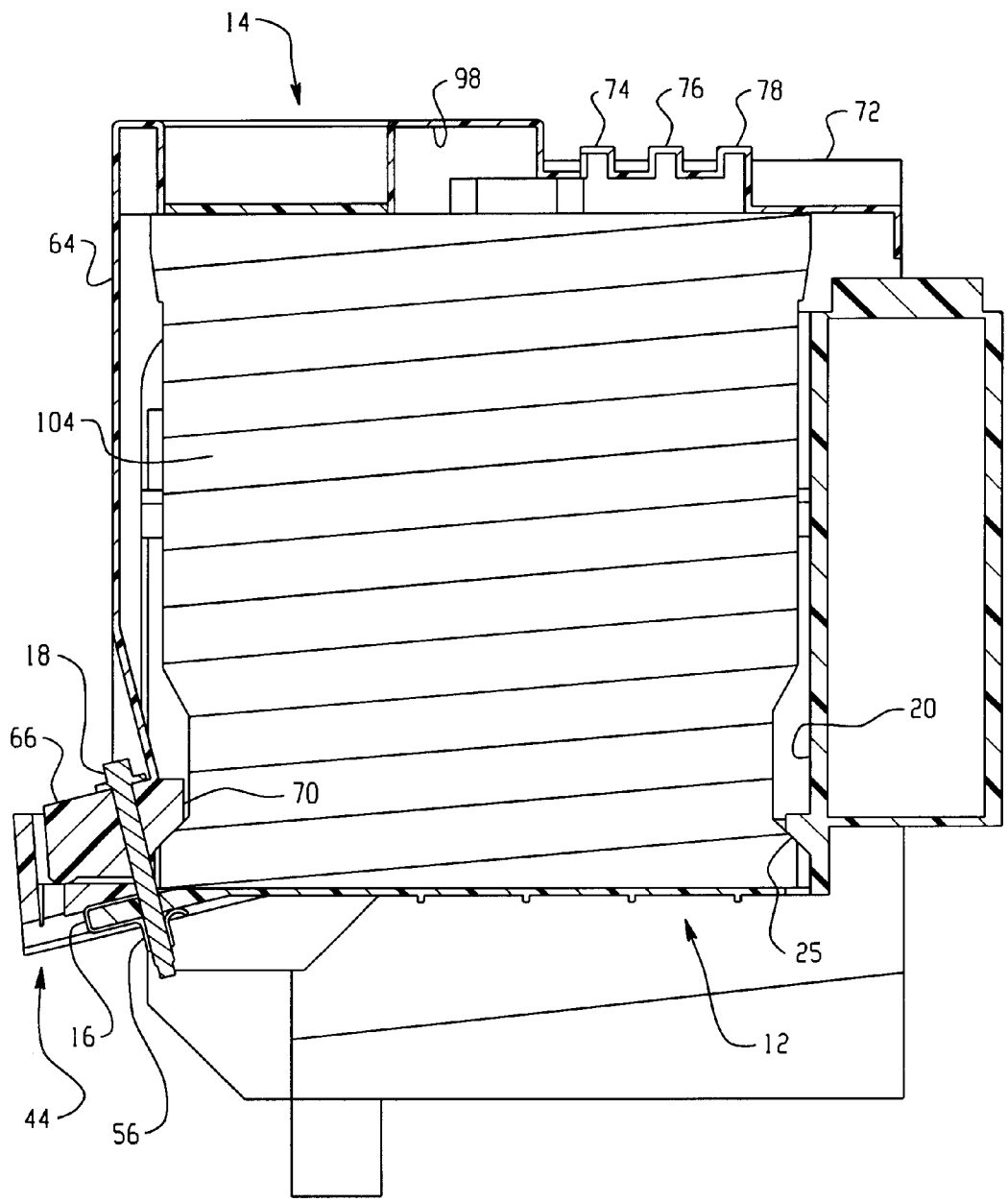
FIG. 7 is a section view taken along section-indicating lines 7—7 of FIG. 5.

Referring to FIG. 7, the battery tray wall 20 has a rib 25 formed thereon which engages a groove formed in the battery above a toe flange on the backside of the battery to retain the battery vertically in the tray. The battery 104 is shown positioned on the tray 12 with the toe flange on the back surface of the battery engaging the undersurface of rib 25 on the backwall 20 of the tray. The mounting block heel portion 70 is shown wedged against a similar toe flange provided on the front of the battery. Bolt 18 is received through the clip and mounting portion 46 and is engaged in the threads in the projection 56 on the clip 16.

Figure 6:
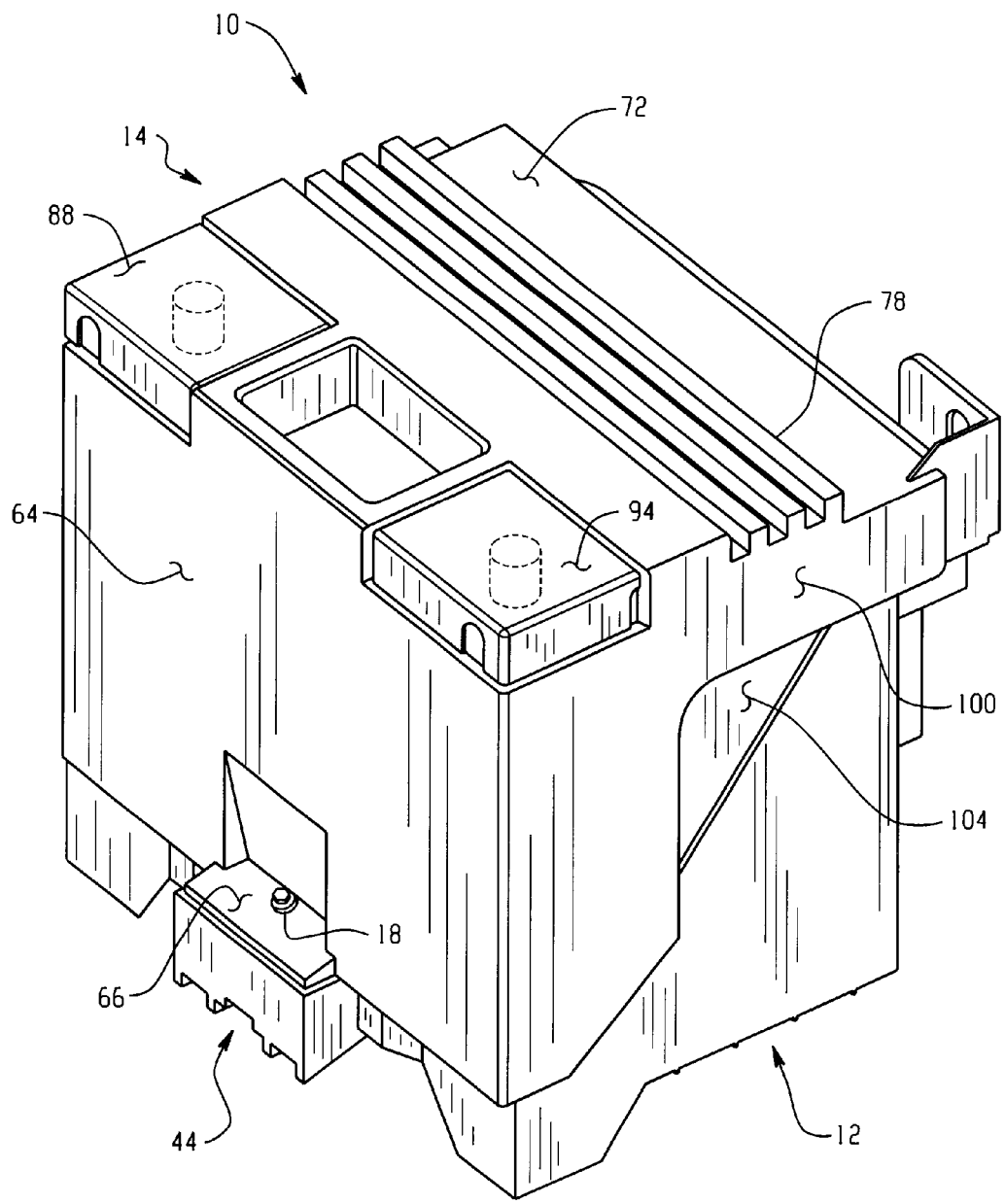
FIG. 6 is an axonometric view of the assembly of FIG. 5 with the terminal covers in position over the battery electrode terminals.

Referring to FIGS. 6 and 7, the battery electrode covers 88, 94 are shown positioned over the battery electrodes shown in dashed outline in FIGS. 6 and 7 with the flexible strips 86, 92 functioning as living hinges and are recessed by deforming between the cover 88, 94 and the wall of recesses 82, 84 respectively. The strips are preferably not visible where recessed. Thus, the electrode caps, when installed, give an appearance as being part of the cover/heat shield member 14.

Figure 8:
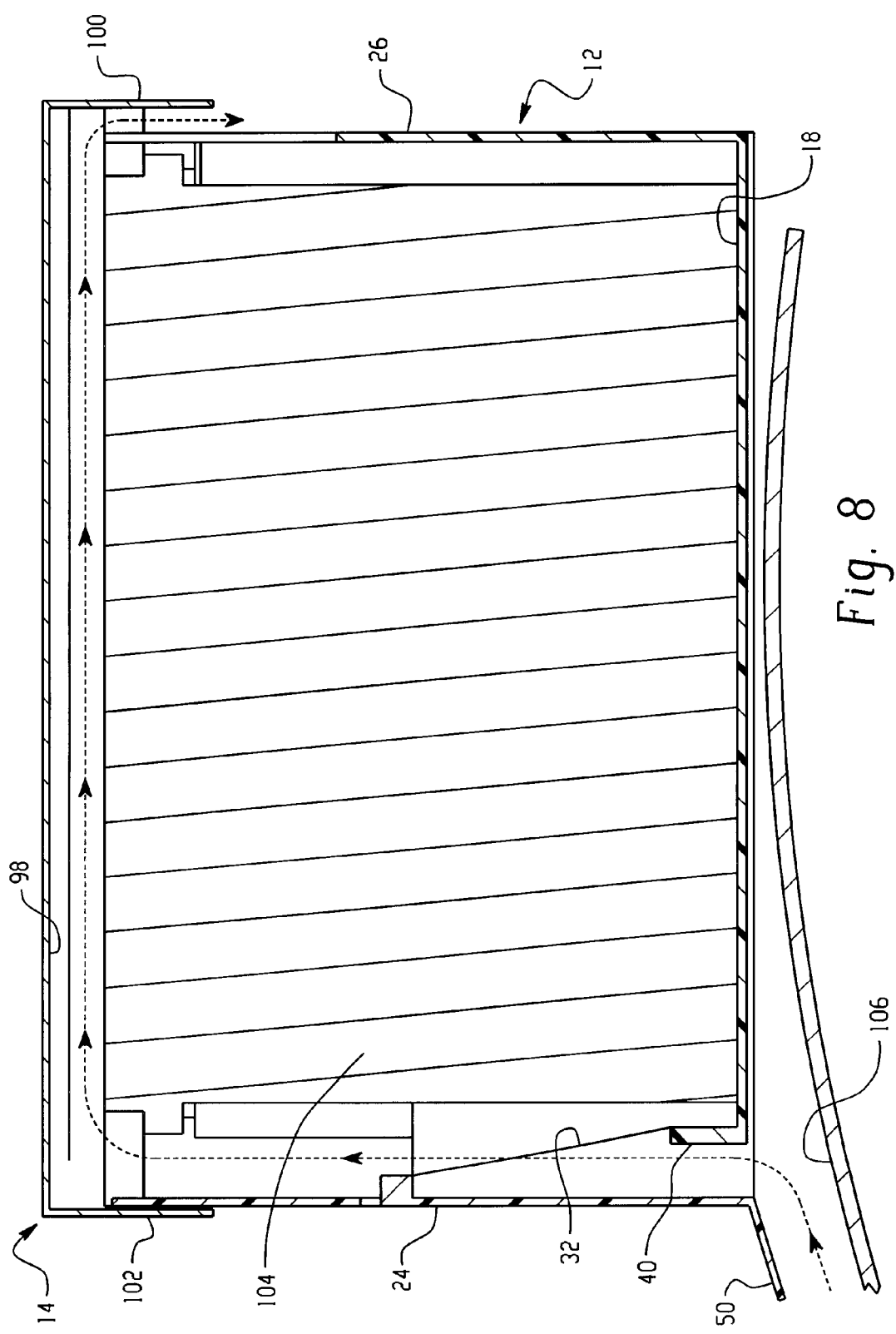
FIG. 8 is a section view taken along section-indicating lines 8—8 of FIG. 5.

Referring to FIG. 8, the assembly 10 is shown installed in the engine compartment of the vehicle with the undersurface of the tray 18 disposed over the upper surface of the fender wheel well denoted by reference numeral 106 such that air flows through the apertures in the battery tray, one of which is shown in FIG. 8 and denoted by reference numeral 40. The air travels upwardly in the space between the ribs 32 and enters the undersurface of the cover and can circulate along channel 98 and along the underside of 74, 76, 78 and along the front of the battery and outwardly therefrom at the opposite end of the battery in the space between the battery and end wall 100 of the cover 72 as shown by the black arrows in FIG. 8.

Figure 13:
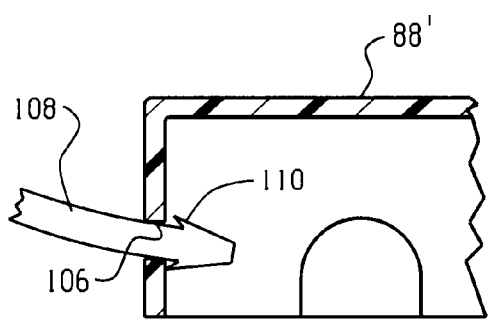

Referring to FIG. 13, an alternate embodiment of the electrode caps is indicated at 88' wherein an aperture 106 is formed in the sidewall of the cap 88'; and, the living hinge comprises a separately formed strip 108 having a barbed end 110 which is inserted through aperture 106 and retained therein. It will be understood that the embodiment of FIG. 13 thus permits the electrode caps to be formed, preferably by molding separately from the member 14. It will be understood that in the embodiment of FIG. 13, the opposite end of the strip 108 is similarly inserted in an aperture provided in the wall of the recesses 82, 84 in the cover member 14, or alternatively may be integrally formed therewith.

The present invention thus provides an integral one-piece combination battery cover, heat shield, hold down and air flow director for cooling the battery when installed over the battery positioned on a mounting tray having ribs in one sidewall thereof with apertures through the tray to facilitate air circulation over the battery when installed. The battery electrodes are conveniently covered by separate electrode covers preferably integrally molded as one piece with the cover/heat shield via flexible living hinges attached to the electrode covers.

Although the invention has hereinabove been described with respect to the illustrated embodiments, it will be understood that the invention is capable of modification and variation and is limited only by the following claims.

What is claimed is:

1. A method of making a combination battery cover and heat shield comprising:
   (a) molding a battery cover having a heat shield formed integrally therewith at substantially right angles thereto and forming a void therein for accessing a battery terminal;
   (b) molding a battery terminal cover conforming to said void;
   (c) interconnecting said battery cover and battery terminal cover with a flexible strap hinge; and,
   (d) deforming said strap hinge and disposing said terminal cover over said void and recessing said strap hinge below the surface of said terminal cover.

2. The method defined in claim 1, wherein said step of interconnecting includes molding said battery cover, said battery terminal cover and said strap integrally as one piece.

3. The method defined in claim 1, wherein said step of molding said battery cover includes molding a ramp on said cover for wedging against vehicle structure in a collision.

4. The method defined in claim 1, wherein said step of molding a battery cover includes molding thereon a plurality of spaced ribs and forming a vent in the side of at least one of said ribs during said molding.

5. The method defined in claim 4, wherein said step of molding said ribs includes disposing said ribs in spaced parallel arrangement.

6. The method defined in claim 1, wherein said step of forming a void includes forming a recess in said cover and forming said void in said recess.

7. The method defined in claim 1, further comprising disposing said battery cover over a battery and disposing a terminal of said battery in said void.

8. A method of retaining and heat shielding a battery disposed in a vehicle battery tray comprising:
   (a) molding as one piece a combination battery cover and side heat shield and forming a camming surface on a lower portion of said side heat shield;
   (b) moving a retaining member against said battery tray surface and camming said battery in said tray with one of said camming surface and said retaining member; and,
   (c) securing said retaining member and cover in said camming condition.

9. The method defined in claim 8, wherein said step of molding includes molding from the group consisting essentially of (i) one-shot molding and (ii) two-shot molding with overmolding.

10. The method defined in claim 8, wherein said step of molding said cover includes molding a plurality of ribs on said cover and forming a vent in the side of at least one of said ribs during said molding.

11. The method defined in claim 8, wherein said step of molding includes molding said battery cover, said side heat shield and said retaining member integrally as one piece.

12. The method defined in claim 8, wherein said step of moving a retaining member and camming includes wedging.

13. A method of mounting and retaining a vehicle battery in a battery tray comprising:
   (a) forming a battery tray with a vertical side wall having a first vertically extending channel formed integrally therewith and forming at least one vent void through said tray communicating with said first channel;
   (b) disposing a battery in said tray and registering said battery against said side wall;
   (c) forming a second channel in a battery cover and heat shield and covering said battery and securing said cover and shield on said tray; and,
   (d) communicating said second channel with said first channel and flowing battery cooling air through said void and said channels.

14. The method defined in claim 13, wherein said step forming a battery includes tapering said ribs in the vertical direction.

* * * * *